No. 861,242. PATENTED JULY 23, 1907.
T. A. EDISON.
CAN OR RECEPTACLE FOR STORAGE BATTERIES.
APPLICATION FILED AUG. 16, 1904.
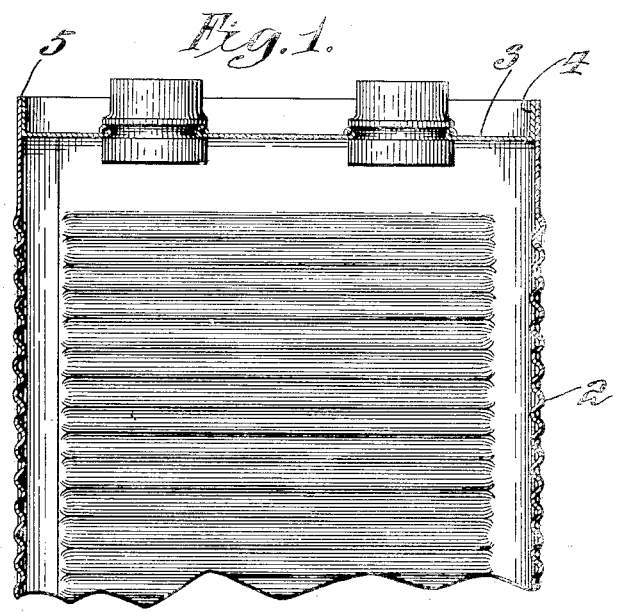
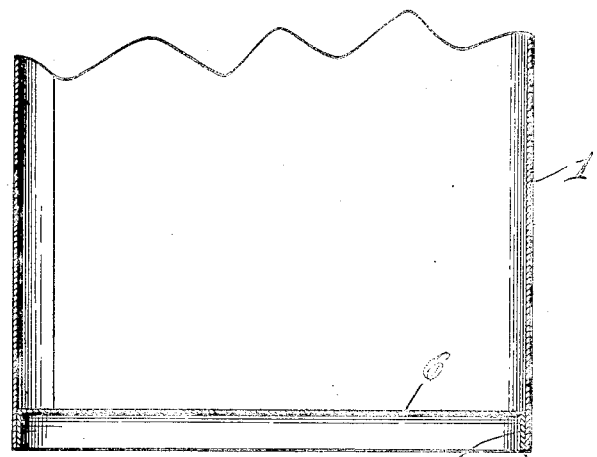
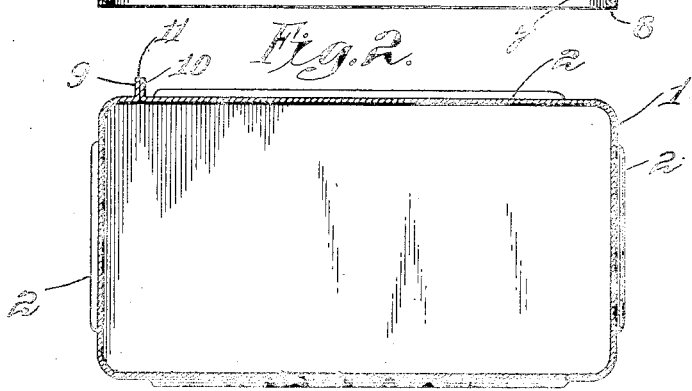
Witnesses
Inventor
Thomas A. Edison
By his Attorney
Frank L. Dyer

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

CAN OR RECEPTACLE FOR STORAGE BATTERIES.

No. 861,242.      Specification of Letters Patent.      Patented July 23, 1907.

Application filed August 16, 1904. Serial No. 220,912.

*To all whom it may concern:*

Be it known that I, THOMAS A. EDISON, a citizen of the United States, residing at Llewellyn Park, Orange, county of Essex, State of New Jersey, have invented certain new and useful Cans or Receptacles for Storage Batteries, of which the following is a description.

My invention relates to metallic cans or receptacles for storage batteries, particularly of the type invented by me, wherein iron or nickel is used as the active materials. At the present time, the cans which are commercially used for this purpose are composed of very thin sheet steel, carefully nickel-plated with corrugations formed in the side and end faces to secure the necessary stiffness, the joints at the side seam and at the top and bottom, being made liquid and gas tight by the use of an insoluble solder. Difficulty has been experienced in using a solder for this purpose owing to the fact that the joint sometimes becomes affected by reason of local electrolytic action between the solder and the adjoining metallic surfaces, and this difficulty is more likely to occur at the top of the can, since the top requires to be secured in place after the electrode plates have been introduced in position, and consequently the same opportunity is not presented for making as good a mechanical joint at the top as at the side seam or bottom.

The object of my present invention is to provide an improved can or receptacle for a storage battery, wherein the difficulty referred to may be overcome.

To this end the invention consists in making the can or receptacle with a top welded in place, so that no solder whatever will be necessary, and preferably the invention consists in a can or receptacle, whose side seam is welded, and whose bottom is also welded in position.

In order that the invention may be better understood, attention is directed to the accompanying drawings forming a part of this specification, and in which Figure 1 is a vertical sectional view, showing the can or receptacle in its preferred form. Fig. 2, a cross sectional view showing the side seam, after it has been welded, but before it has been turned down, and Fig. 3, a corresponding view showing the side seam in its final form.

In these views, corresponding parts are represented by the same numerals of reference.

The body 1 is made of a very thin sheet metal such as iron or steel, carefully nickel-plated, with the nickel coating welded in position, as I have described in patents heretofore granted. To provide for the necessary stiffness, corrugations 2—2 may be formed in the side and end faces of the can. The top 3 is provided with flanges 4, fitting closely within the body 1, and secured in position with a liquid and gas tight joint by welding the metal along the line 5. This welding may be accomplished in any suitable way, but preferably by the method and apparatus described in my application for Letters Patent, filed on the 21st. day of July 1904, Serial No. 217,538 and wherein a rotating carbon is caused to progress slowly around the line of the seam to form an arc between the carbon and the can, and by which the welding may be accomplished. In this way, the welded portion is superficial and extends only a short way down from the upper edge of the flange 4, so that when it becomes necessary to remove the top for any reason, this may be done merely by filing off the welded portion, so as to free the top. The flange 4 is sufficiently deep to allow this to be done a number of times. The bottom 6 is provided with a down turned flange 7, and is also preferably welded in position like the top along the line 8. The body 1 is formed with a seam between the flanges 9 and 10, which seam is located at one side of the line of corrugations, as shown, so as not to interfere with the same. The flanges 9 and 10 are also preferably welded along the line 11, and thereafter the flanges are turned down as shown in Fig. 3 so as not to interfere with the symmetrical appearance.

Obviously, the bottom and side seams may be welded in any other suitable way, but preferably by the process and apparatus described in my application above referred to.

Having now described my invention, what I claim as new and desire to secure by Letters Patent, is as follows:

1. A metallic can or receptacle comprising a body and a flanged top, said flange being welded to the body along its edge only, whereby the top may be separated from the body by the removal of a portion of the flange, substantially as set forth.

2. A metallic can or receptacle comprising a body and a flanged bottom, said flange being welded to the body along its edge only, whereby the bottom may be separated from the body by the removal of a portion of the flange, substantially as set forth.

This specification signed and witnessed this 10th day of August 1904.

THOMAS A. EDISON.

Witnesses:
    FRANK L. DYER,
    MINA C. MAC ARTHUR.